UNITED STATES PATENT OFFICE.

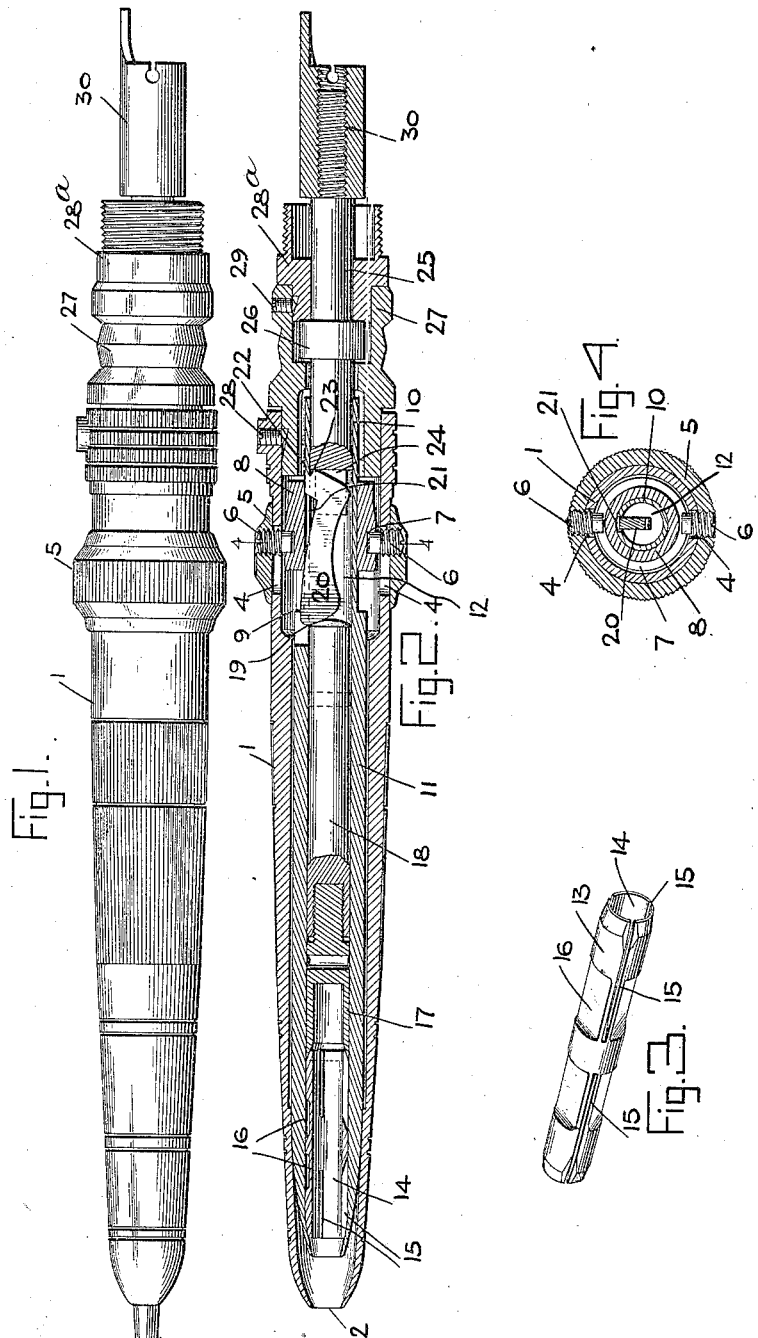

CHARLES EDGAR NORTHROP, OF THORSBY, ALABAMA.

HANDPIECE FOR DENTAL MACHINES.

1,063,282.		Specification of Letters Patent.		Patented June 3, 1913.

Application filed June 6, 1912. Serial No. 702,023.

*To all whom it may concern:*

Be it known that I, CHARLES E. NORTHROP, a citizen of the United States, and a resident of Thorsby, in the county of Chilton and State of Alabama, have invented a new and Improved Handpiece for Dental Machines, of which the following is a full, clear, and exact description.

My invention relates to hand pieces used in connection with dental machines, and has reference more particularly to a device of that class which comprises a shell provided with a shaft, and means associated with the shell and shaft whereby a dental tool is held firmly on the shaft, and may be actuated through the medium of the shaft in the shell.

An object of the invention is to provide an inexpensive, simple and reliable device in which by a simple manipulation the dental tool is engaged or disengaged from the device, and in consequence dental tools may be easily changed.

A further object of the invention is to provide a device that will hold firmly dental tools having shanks of different thicknesses.

The invention consists in the novel construction and combination of parts, to be more fully described hereinafter and particularly set forth in the claims.

Reference is to be had to the accompanying drawings forming a part of this specification, in which similar characters of reference indicate corresponding parts in all the views.

Figure 1 is a side elevation of an embodiment of my invention; Fig. 2 is a longitudinal section of the same; Fig. 3 is an enlarged perspective view of the clamp that holds the shank of the dental tool; and Fig. 4 is a transverse section on the line 4—4 of Fig. 2.

Before proceeding to a more detailed description of my invention, it must be understood that the form or shape of the device may be varied in accordance with special conditions, and the general relation of parts may be differently arranged without departing from the underlying spirit of the invention.

Referring more particularly to the drawing, I provide a shell 1 preferably slightly conical exteriorly, and with its surface indented, the end of the shell being smoothly tapered to a smaller diameter, and provided with a concentric orifice 2 to admit the shank of a dental tool 3. Near the opposite end or head of the shell 1, two longitudinal slots 4, diametrically opposite, are provided, and covered by a slidable ring 5 exteriorly mounted on the shell. The ring 5 carries two studs 6, also diametrically opposite, and registering with the slots 4, and projecting into the groove 7 of a slidable collar 8 loosely fitted into the concentric cylindrical recess 9 provided in the head of the shell 1. The collar 8 fits also snugly on the cylindrically reduced end 10 of a hollow shaft 11, which fits loosely with its normal surface into the reduced end of the recess 9 in the shell 1, and bears with its opposite conically reduced end against a slight conical surface also formed in the shell 1. The same conical end of the hollow shaft 11 has its cylindrical bore 12 at that end conically reduced, and receives the clamp 13 bearing with one end against the interior conically formed end. The clamp 13 is provided with a cylindrical bore 14 that receives the shank of a tool, and both ends being similarly provided with a plurality of longitudinal slits 15 and notches 16 on the exterior surface of the clamp to give the said ends the necessary resiliency to grip or release the shank of a dental tool. Both ends of the clamp 13 are similarly cone-shaped, and the upper end engages a circular flared end of a yoke 17 screwed into the end of a plunger 18, all smoothly fitting into the bore 12 of the hollow shaft 11, the other rounded end of the plunger 18 bearing against the beveled face 19 at one extremity of an angular lever 20, introduced into the bore 12 of the hollow shaft 11 through a slot 21. The lever has a normally inclined projection through the slot 21. The opposite end of the said lever 20 is provided with a notch 22 engaging a sharp projection 23 provided in the end of the slot 21, and fulcrums about this point. The collar 8 fitting snugly over the reduction 10 of the shaft 11, is made to engage with its inner surface the projecting end of the lever 20.

Into the end of the bore 12 at the reduced end 10 of the shaft 11, a slotted end 24 of a shaft 25 is introduced, fitting loosely, and engaging with the slot the end of the lever 20, so that the projecting part of the lever below the fulcrum bears against the shaft 25 in the slotted end 24. The shaft 25 is also provided with a collar 26 fitting loosely into a nipple 27 mounted on the recess 9 of the shell 1 by means of a screw 28, the nipple 27 being also provided at the opposite end with a recess for the reduced end of the shaft 11. Fitting against the other side of the collar 26 and in engagement with the nipple 27 is a male part of a union 28ª held in the nipple 27 by means of a screw 29, and serving as a bearing for the end of the shaft 25, the same end of the shaft 25 being provided with a threaded reduction, and receiving a yoke 30 that connects the device to the driving shaft of a dental machine, the driving shaft being also provided with a female part of a union to screw on the part 28ª (not shown in the drawing), thus forming a smooth connection with the device.

The device as shown in Fig. 2, is ready to receive the shank of a dental tool into the clamp 13. When the shank is introduced, the ring 5 on the shell 1 is forced to slide toward the tool, and in consequence the stud 6 engaging the collar 8 forces the same to slide in the same direction on the reduced end of the hollow shaft 11, and thus forcing with its inner surface the projecting end of the lever 20 to enter the slot 21 in the bore 12 of the hollow shaft 11, whereby the inclined end 19 of the lever 20 bearing against the rounded end of the plunger 18 forces the same toward the tool as the other end of the lever is bearing against a laterally fixed end of the shaft 25. The plunger 18, being connected to the yoke 17 and the yoke engaging with its flared end the end of the clamp 13, forces the same against the conical reduction within the shaft 11, and consequently both slotted ends of the clamp are made to contract by the engagement of the yoke on the upper end of the clamp and the reduction in the shaft 11 on the lower slotted end of the clamp, whereby the tool is clamped. The position of the ring 5 when a tool is clamped, is shown in Fig. 1. To remove a tool, the process is reversed.

It can be readily seen that my device is very easily adjusted, as the clamp 13 can be made to grip tighter by simply increasing the length between the flared end of the yoke 17 and the fixed end of the plunger 18 by unscrewing the yoke 17 from the plunger 18.

Having thus described my invention, I claim as new and desire to secure by Letters Patent:

1. A device of the class described, comprising a shell, a hollow shaft within said shell, a clamp in one end of said hollow shaft and adapted to receive the shank of a tool, a plunger in said shaft for engagement with said clamp, a lever in said hollow shaft, one end of said lever engaging said plunger, and the other end of said lever being fulcrumed on the hollow shaft, and means for actuating the lever to force the plunger to engage the clamp, thereby causing the clamp to grip the tool shank.

2. A device of the class described, comprising a shell, a hollow shaft positioned in said shell, a clamp at one end and within said shaft, a plunger in said hollow shaft and in engagement at one end with said clamp, the other end of said plunger being rounded, a lever in said hollow shaft provided with an inclined face at one end, and fulcrumed at the other end, the said inclined face of the lever engaging with the rounded end of the said plunger, and means associated with said lever and hollow shaft whereby said plunger is forced to engage the said clamp, thus gripping a shank of a tool within said clamp.

3. A device of the class described, comprising a shell, a hollow shaft within said shell, a clamp, a plunger, and a lever within said hollow shaft, the plunger having a rounded end, said lever having at one end an inclined face for engagement with the rounded end of the plunger and projecting at said end through the hollow shaft, the other end of said lever having a notch engaging a projection on the surface of said hollow shaft to fulcrum the lever and means associated with said lever whereby a tool is clamped in said clamp.

4. A device of the class described, comprising a shell, a hollow shaft within said shell and provided with a slot, a clamp within said hollow shaft at one end, a plunger in said hollow shaft for engagement with said clamp, an angular lever in said hollow shaft and having a beveled face at one end for engagement with the end of the plunger, the other end of said lever being fulcrumed on the hollow shaft at the end of the slot, the said lever normally projecting through said slot, a shaft held against longitudinal movement and extending at one end into the hollow shaft and engaging the said lever below the fulcrum, and means for actuating the lever to force the plunger to engage the clamp.

5. A device of the class described, comprising a shell, a hollow shaft in said shell, a clamp within said hollow shaft at one end, a plunger in said hollow shaft and in engagement with said clamp, a lever in said hollow shaft and projecting through a slot in the same, one end of said lever engaging the end of the plunger and the other end being fulcrumed, a shaft extending into the hollow shaft and engaging the last mentioned end of said lever adjacent its fulcrum, means for holding the said shaft against longitudinal movement, a slidable collar on the hollow shaft for engagement with the projecting portion of said lever, and means for actuating said slidable collar.

6. A device of the class described, comprising a shell having its bore enlarged at its head end, a hollow shaft positioned within said shell and having a reduced end extending within the enlarged portion of the bore of the shell, clamping means within said hollow shaft at the other end, a plunger in said hollow shaft and in engagement with said clamping means, a lever in said hollow shaft and in engagement at one end with said plunger, the said hollow shaft having a slot through which said lever projects, the other end of said lever being fulcrumed on the hollow shaft at the end of said slot, a nipple secured in the enlarged bore at the head end of the shell, the said nipple extending over the reduced end of the hollow shaft, a shaft fitting loosely in the reduced end of the hollow shaft and in engagement with said lever adjacent the fulcrum, the said shaft extending through the nipple and being held against longitudinal movement, a slidable collar in the enlarged bore in the head of the shell and fitting on the reduced end of the hollow shaft, the said collar being adapted for engagement with the projecting portion of the lever to actuate the same to cause the plunger to engage the clamping means, and means for moving the slidable collar.

7. A device of the class described, comprising a shell provided with oppositely arranged longitudinal slots near one end, a hollow shaft within said shell and having a reduced end provided with a longitudinal slot, a clamp mounted within said hollow shaft at the other end, a plunger in said hollow shaft and in engagement with the said clamp, an angular lever in the bore of said hollow shaft and projecting normally through the slot in said shaft, the said lever having an inclined end bearing against the end of the plunger, the other end of said lever being fulcrumed, a shaft held against longitudinal movement and having one end fitting loosely in the reduced end of the hollow shaft and engaging the last mentioned end of said lever, a slidable collar fitting on the reduced end of the hollow shaft and having a circumferential groove, the said collar being adapted to engage the projecting portion of the lever to move the same to actuate the plunger, a slidable ring mounted on the shell, and studs carried by said slidable ring at opposite sides thereof, the said studs extending through the slots in said shell and projecting into the grooves in said slidable collar.

In testimony whereof I have signed my name to this specification in the presence of two subscribing witnesses.

CHARLES EDGAR NORTHROP.

Witnesses:
 HOWARD C. JUNKERMAN,
 A. K. HORN.

---

Copies of this patent may be obtained for five cents each, by addressing the "Commissioner of Patents, Washington, D. C."